United States Patent [19]

Lint et al.

[11] Patent Number: 4,614,030

[45] Date of Patent: Sep. 30, 1986

[54] METHOD AND APPARATUS FOR AUTOMATICALLY PROCESSING THE WIRE ENDS OF WOUND TOROIDAL CORES

[75] Inventors: James D. Lint, San Diego, Calif.; Bryan P. Kent, Sisters, Oreg.

[73] Assignee: Varian Associates, Inc., Palo Alto, Calif.

[21] Appl. No.: 734,961

[22] Filed: May 16, 1985

[51] Int. Cl.$^4$ .................... H01R 43/00; B23P 19/00
[52] U.S. Cl. ........................................ 29/885; 29/792; 29/822; 29/DIG. 78
[58] Field of Search ................ 29/885, 835, 714, 792, 29/759, 785, 822, DIG. 78, 592 R; 140/1; 242/4 R, 4 B

[56] References Cited

U.S. PATENT DOCUMENTS

3,216,461 11/1965 Camardella ........................ 140/1

Primary Examiner—Howard N. Goldberg
Assistant Examiner—Irene Golabi
Attorney, Agent, or Firm—Stanley Z. Cole

[57] ABSTRACT

An apparatus for automatically processing the wire ends of cores includes a forming die for bending the axially projecting wire ends back to project parallel to one another generally away from the core. Cores are received in a receiving station aligned with the forming die and orientated so that the wire ends are spaced as far as possible from the die. When the wire ends are sensed to be in the correct orientation, an actuator is operated to push the core through the forming die. The core with its wire ends bent back is then preferably stepped through a series of processing stations to trim and tin the wire ends and then ejected from the machine. A series of cores can be stepped continuously one after the other through the machine.

12 Claims, 13 Drawing Figures

METHOD AND APPARATUS FOR AUTOMATICALLY PROCESSING THE WIRE ENDS OF WOUND TOROIDAL CORES

BACKGROUND OF THE INVENTION

The present invention relates to a method and apparatus for automatically forming the wire ends which project from a work piece after a wire or lead has been wound onto the workpiece. More particularly, it concerns a method and apparatus for automatically forming, cutting and trimming the wire ends which project axially from ring-shaped articles such as toroidal cores after a lead or wire has been wound about the core.

As used herein, the term "core" means a ring-shaped article having the plane closed curve cross section of a toroid. The term "wire" as used herein means any material in the form of a flexible strand which is not so supple that it buckles easily when pushed from one end in a lengthwise direction.

Wire wound ferrite cores have been used as electronic components for many years. They are particularly adapted for producing a gapless magnetic field. Inductance coils and transformers can be constructed in this manner. Rheostats can be constructed with cores wound with resistance wire. Very small wire wound cores have also been used as memory elements in computers.

Originally wire was wound onto such cores by hand. Since this operation is both tedious and time consuming, and produces non-uniform results, various automatic core winders have been devised which wind wire onto cores automatically.

Initially, automatic core winders involved a rotating shuttle for carrying the wire at high speed repeatedly through the central aperture of the core. (See, for example, U.S. Pat. No. 2,810,530).

More recently, shuttleless core winders have been developed which do not require insertion of a shuttle through the central aperture of the core. Instead, wire is guided in a coil which extends through the central aperture of the core, and is driven around the guide path to form successive coils or loops which are subsequently tightened on the core by suitable braking or anchoring of the wire ends.

Shuttleless core winders of this type are shown, for example, in U.S. Pat. Nos. 3,985,310 and 4,288,041, both owned by the assignee of the present application, and U.S. Patent Application Ser. No. 610,448, also assigned to the assignee of this application. In these winders, one or more wires can be wound onto a core.

In these core winders, the trailing end of the wire must be cut from the source once sufficient wire has been fed. This is normally done with a suitable cutting device at any time after sufficient turns have been tightened on the core to anchor the trailing wire end (the trailing loop of wire is tightened first in this type of core winder).

There will normally be excess of the wound wire in this technique, since more wires must be formed into loops than will be ultimately wound onto the core, to ensure that there is sufficient wire to be driven around the guide path during the formation of the last turns of the core. In U.S. Pat. No. 4,288,041 and Application Ser. No. 610,448 this excess wire is cut off by directing the leading end of each wire downwardly out of the guide path, and shearing the excess end off once the wire extends tightly from the core in a straight line.

In these and other shuttleless core winders of this general type the core ejected after the winding operation will still have wire ends projecting axially from the inner periphery of each side of the core. It is common for these core ends to be manually shaped, trimmed and tinned before packaging the finished product. This manual finishing procedure is time consuming and labor intensive, and results in a relatively expensive final product which is of inconsistent quality.

SUMMARY OF THE INVENTION

The primary object of the present invention is to provide a method and apparatus for at least automatically forming or bending the axially projecting ends of the wire leads on wound toroidal cores.

It is a further object of the invention to provide a method and apparatus for automatically finishing the wire ends of wound toroidal cores to put them into a condition suitable for final packaging with little or no further work.

According to a preferred embodiment of the present invention a wound core ejected from a winder and having wire ends projecting axially from each side is received in a receiving station of a wire end finishing apparatus. The apparatus includes a forming die for bending the wire ends, and the receiving station is located spaced from and in alignment with the forming die. Each core received in the receiving station is located with its plane in alignment with the forming die.

An orientation device for orientating the wire ends in a predetermined position relative to the forming die is mounted at the receiving station. The orientation device includes an assembly for rotating the core and a sensor for detecting when the wire ends are located as far as possible from the forming die, i.e. the core is orientated with the wire ends remote from the forming die.

At this point, a core moving device is actuated to urge the orientated core through the forming die, which acts to bend the wire ends back until they project parallel to one another in a direction pointing generally away from the core. Since the unformed wire ends project axially from the inner periphery of the core, after forming the ends will lie flat against opposite sides of the core and project generally away from the center of the core.

The apparatus preferably also includes a cutting station for cutting the formed wire ends to a predetermined length and a tinning station in which the cut ends are plunged into a bath of high temperature solder. A transport mechanism is provided for transporting cores from station to station through the apparatus. The apparatus is preferably automatically controlled to transport cores sequentially and continuously one by one through the successive stations, so that at the same time that a finished core is being ejected by a suitable ejection mechanism, a new core is being loaded into the receiving device and a series of cores in various stages of processing are located at the various stations.

In a preferred embodiment of the invention, the cores are transported from one station to the next on a rotatable indexing wheel having a series of spaced holders for releasably carrying the cores.

According to another preferred feature of the invention, an automatic transport mechanism is provided to deliver wound cores from a winding machine to the wire end finishing machine. This suitably comprises a pneumatic tube having a holding or latching device for holding each core for a controlling time interval so that it is delivered to the finishing machine in time with the simultaneous movement of the preceding core from one station to the next in the machine. A suitable automatic controller operated in response to signals received from various sensors in the machine is provided to control transport of the cores throughout the machine and to control the various processing steps carried out at each station.

Thus the method and apparatus of this invention allows wound core wire ends to be processed automatically. Production rates can thus be increased significantly and a relatively consistent quality of product may be achieved.

BRIEF DESCRIPTION OF THE DRAWINGS

The above and other objects and disadvantages of the present invention will be more apparent from the following detailed description of a preferred embodiment of the invention, taken in conjunction with the accompanying drawings, in which like reference numerals refer to like parts and in which.

DESCRIPTION OF THE REFERRED EMBODIMENT

Figure 11:
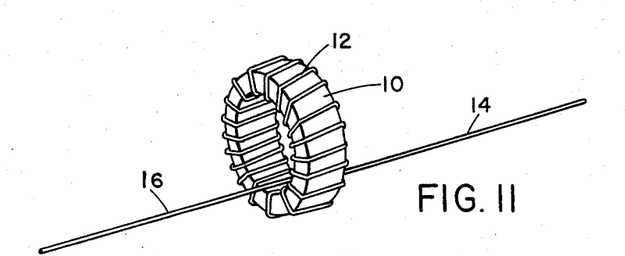
FIG. 11 is a perspective view of a coil as received in the machine.
Figure 12:
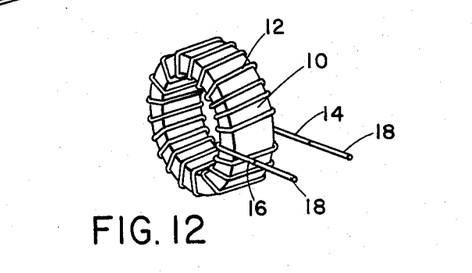
FIG. 12 is a perspective view of a completed coil as ejected from the machine.

The drawings illustrate an apparatus according to a preferred embodiment of the invention for automatically forming the axially projecting wire ends of toroidal cores on which a wire has been wound in an automatic core winder (not shown). FIG. 11 illustrates a typical toroidal core 10 as it appears when ejected from a core winder, with a wire 12 wound on the core having its leading and trailing ends 14 and 16, respectively, projecting axially from opposite sides of the core. FIG. 12 illustrates the core as it will appear when the wire ends have been finished to put the core in a state ready for packaging. As shown, the wire ends 14 and 16 are bent back so as to lie against opposite sides of the core and project parallel to one another away from the core. The wire ends have also been cut to a desired length, with the length shown in FIG. 12 being an example only of one of various lengths which may be chosen. The cut wire ends have also been tinned or coated with solder 18.

Figure 1:
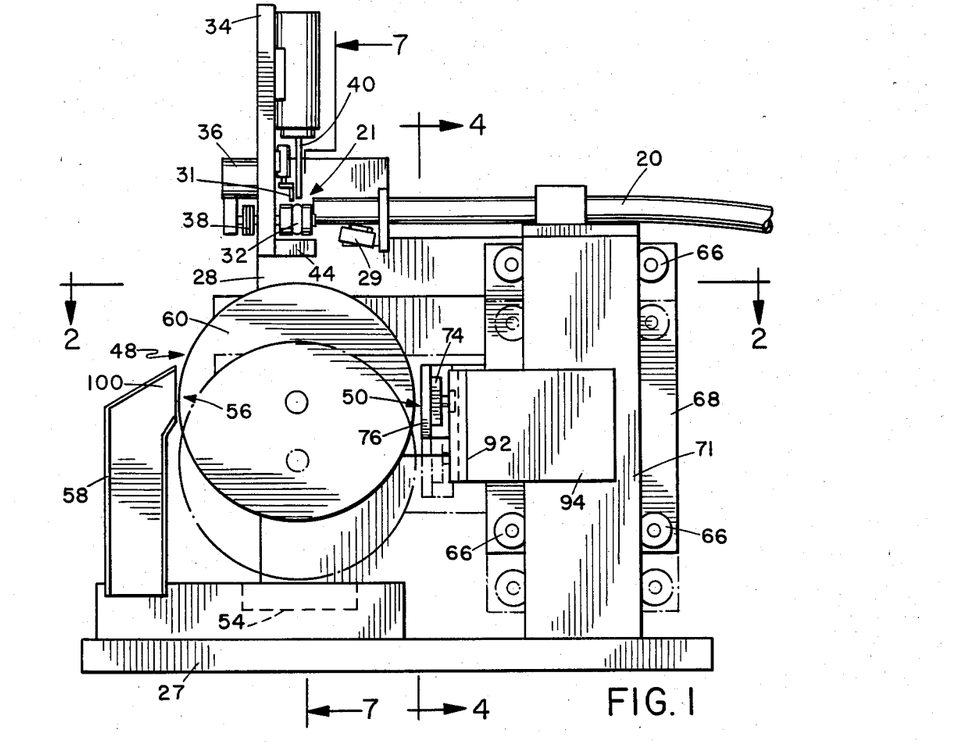
FIG. 1 is a side elevation view of the machine.
Figure 2:
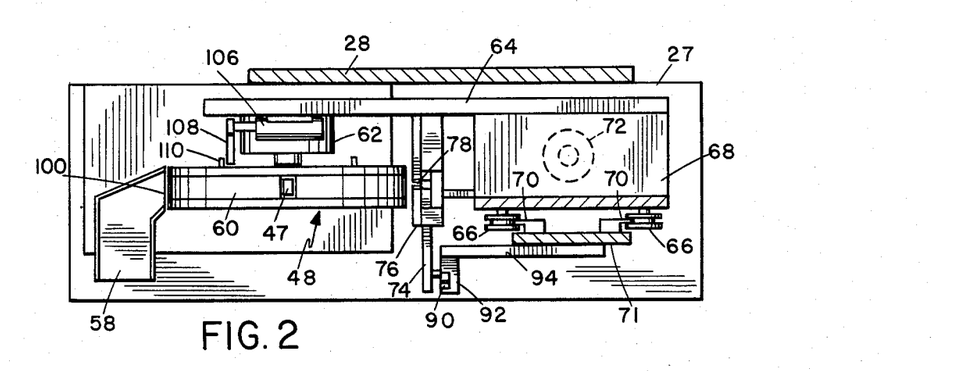
FIG. 2 is a sectional view taken on line 2—2 of FIG. 1.
Figure 3:
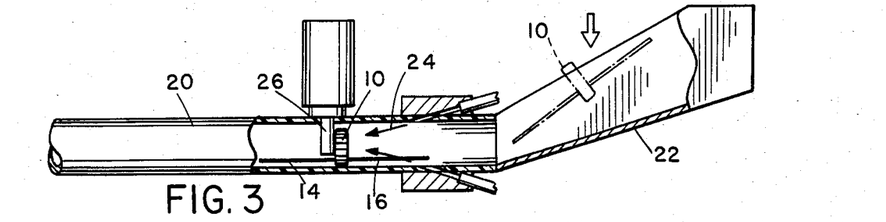
FIG. 3 is an enlarged side elevation view, partially cut away, of the coil feed entry structure.

FIGS. 1 to 10 illustrate an apparatus for automatically finishing the wire ends 14 and 16 of wound toroidal cores in this fashion. Cores ejected from a winder are fed one by one at controlled intervals via pneumatic-feed tube 20 into a receiving station 21 of the finishing apparatus. As best shown in FIG. 3, a core ejected from a core winder is captured in a V-shaped trough or chute 22 and blown by an air flow 24 until it reaches a core retaining latch 26. The trough tends to orientate the core 10 with its leading and trailing wire ends projecting as shown in FIG. 3. When the latch 26 is released by a controller as described in more detail below in connection with FIG. 12, it will be blown by the air flow along the tube and into the receiving station 21.

As described in more detail below, cores arriving at the receiving station are stepped through a series of wire end processing stations before being ejected from the apparatus with the wire ends finished substantially as shown in FIG. 12. The entire finishing apparatus is mounted on base mounting plate 27 and back support plate 28 in the embodiment shown in the drawings, and may be enclosed in an external housing (not shown) if desired.

Figures 7, 8, 9:
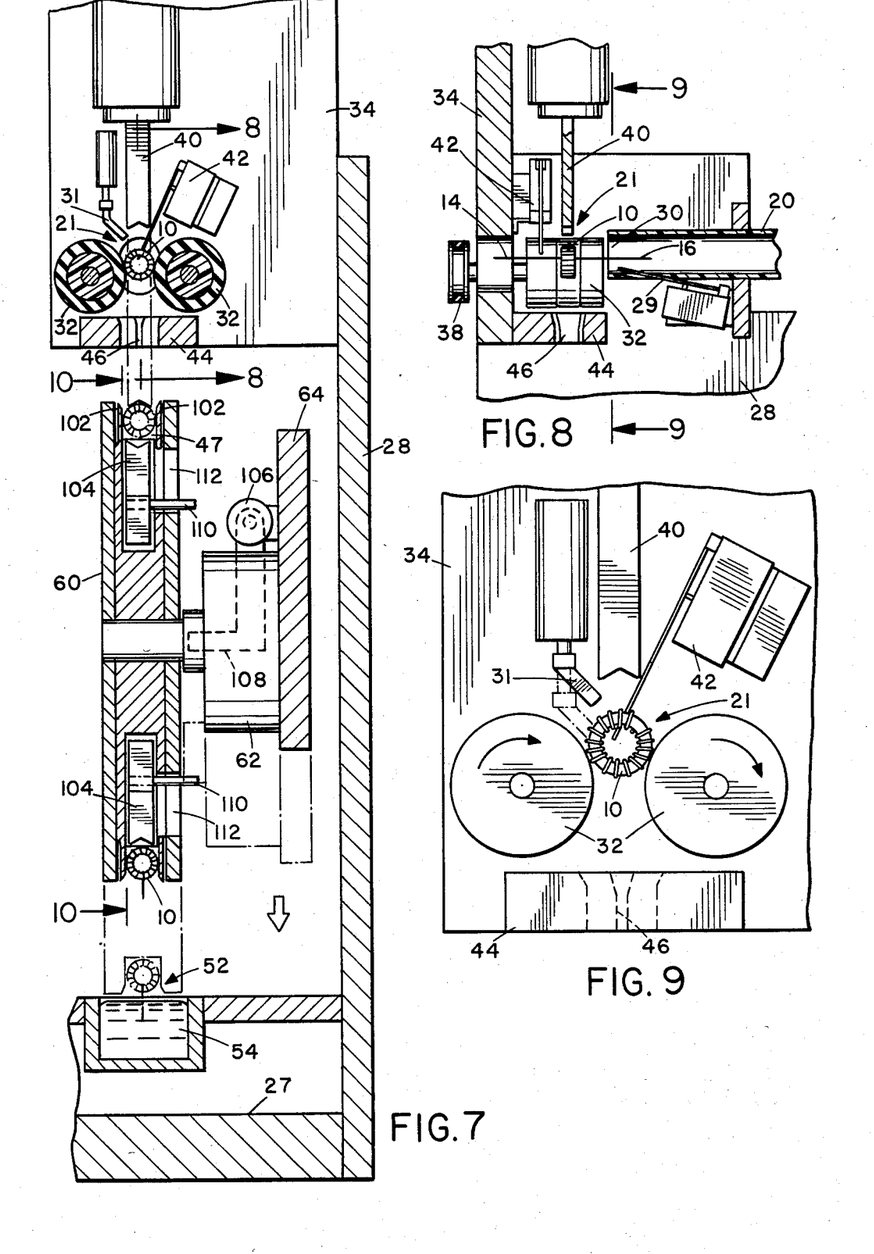
FIG. 7 is an enlarged sectional view taken on line 7—7 of FIG. 1.
FIG. 8 is a sectional view taken on line 8—8 of FIG. 7.
FIG. 9 is an enlarged sectional view taken on line 9—9 of FIG. 8.

The core receiving station 21 is mounted on back support plate 28 as best illustrated in FIGS. 7, 8 and 9. A core arrival sensor 29 at the exit 30 of feed tube 20 will detect the arrival of a core at the receiving station. The arriving core is retained against a suitable retractable stop 31 and located between a pair of rollers 32 for rotating the core, which are rotatably mounted on a support plate 34 mounted to project outwardly from the back support plate 28.

A motor 36 for rotating the rollers 32 via belt drive 38 is mounted on the opposite side of the support plate 34 (See FIG. 1). Mounted on support plate 34 above the receiving station 21 is a loading activator 40 comprising a pneumatically or hydraulically operated ram. A microswitch 42 or other suitable sensor is mounted on the plate at a predetermined position for detecting when the core wire ends are in a particular orientation, as described in more detail below.

A lead forming die 44 is mounted on the plate 34 below the core receiving station 21. The die 44 has a through bore or slot 46 shaped to bend back the axially projecting wire ends of cores forced through the slot.

A core forced through the forming die 44 is received in a core retaining slot 47 on a core transporting mechanism 48 for transporting cores between various processing stations in the finishing apparatus. The processing stations basically comprise the forming die station where cores are forced through the forming die and into an empty retaining slot 47, a cuttng station 50 where the wire ends are cut to length, a tinning station 52 where the cut ends are dipped in a solder bath 54, and a core ejection station 56 where finished cores are ejected from the retaining slot in which they are carried into an ejection chute 58.

Figure 10:
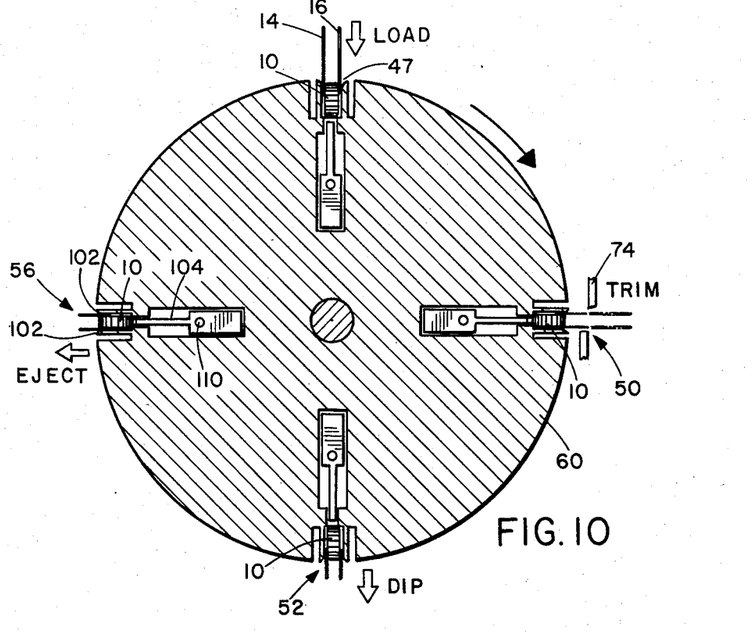
FIG. 10 is a sectional view taken on line 10—10 of FIG. 8.

In the preferred embodiment of the invention shown in the drawings, the core transporting mechanism comprises an indexing wheel 60 having a series of radial core retaining slots 47 spaced around its periphery (see FIG. 10). The various processing stations are mounted around the periphery of the wheel 60, and the wheel is rotated via indexing motor 62, shown in FIG. 7, so as to step the cores from one station to the next throughout the machine. The indexing wheel 60 is rotatably mounted on a back plate 64, which itself is vertically movable via upper and lower spaced sets of guide rollers 66 on a carriage 68 which run in vertical rails 70 (see FIG. 2) on a vertical member 71 mounted on the base plate 27. A vertical activator 72 comprising a ram assembly as shown in FIG. 4 is mounted between the base plate 7 and the carriage 68, with the ram 73 secured to the undersurface of the carriage.

In the embodiment shown in the drawings, there are four equally spaced core retaining slots around the wheel 60, and the four processing stations are also equally spaced around the wheel. However, various other transport mechanisms may be used, which may transport cores in a linear rather than a circular path, for example. A greater or lesser number of processing stations and core retaining slots may also be provided in a guide wheel in other alternative arrangements.

Figures 4, 5, 6:
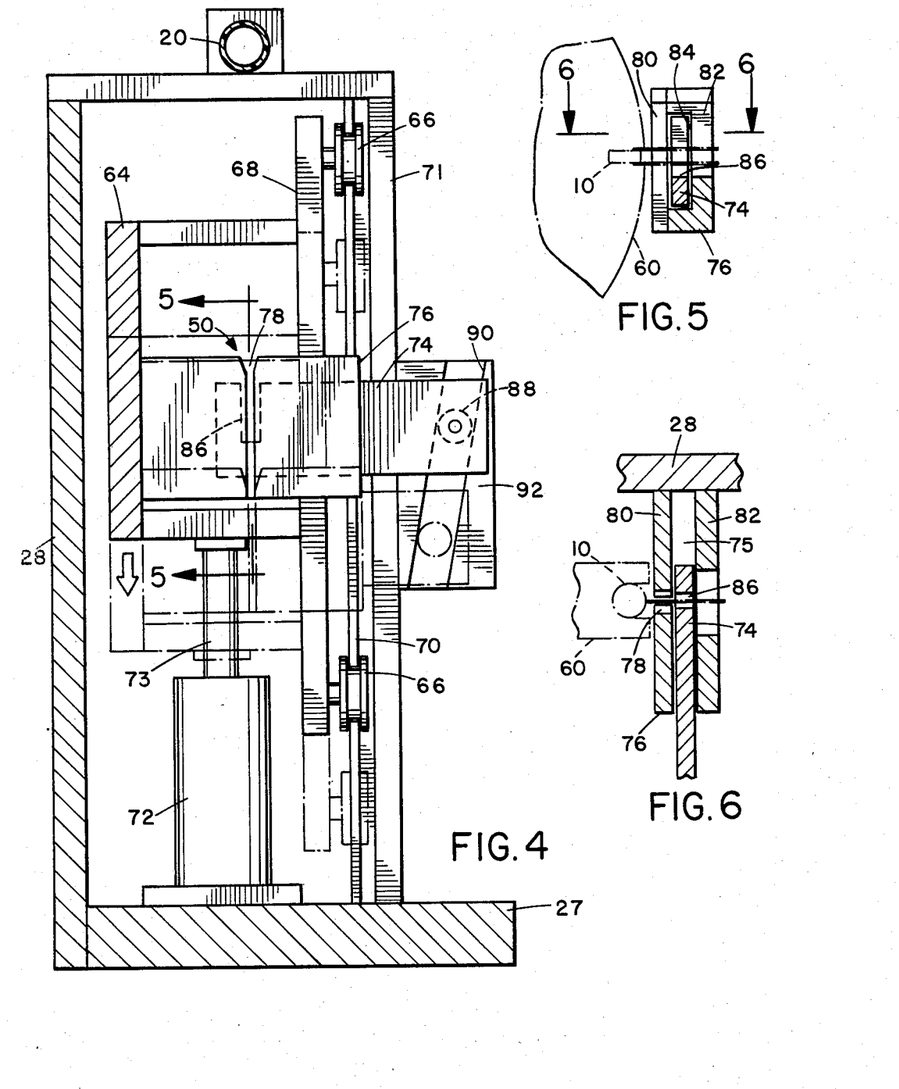
FIG. 4 is an enlarged sectional view taken on line 4—4 of FIG. 1.
FIG. 5 is a sectional view taken on line 5—5 of FIG. 4.
FIG. 6 is a sectional view taken on line 6—6 of FIG. 5.

The cutting station 50 is shown in detail in FIGS. 4, 5 and 6. The cutting station includes a cutter blade 74 guided in a channel 75 defined in a cutter housing 76 having an upwardly facing lead receiving slot 78 for receiving the leads or wire ends of a core transported to the cutting station. The housing 76 comprises opposed plate members 80, 82 mounted to project perpendicularly from the back plate 64, the plate member 82 having a recess 84 defining the cutter blade guide channel 75. The blade 74 has a lead receiving slot 86 which is aligned with the housing slot 78 when the blade is in the position shown in FIG. 6. The blade projects out of the housing 76 as best shown in FIGS. 2 and 4 and is secured to a cam roller 88 which is guided in a cam slot 90 in projection 92 from plate 94 secured to the vertical guide 71 at the cutting station position.

The tinning station 52 is best shown in FIG. 7, and is located vertically below the forming die station. Station 52 comprises solder bath 54 mounted in the base plate 27 of the apparatus.

As shown in FIG. 1, the entry 100 of the core ejection chute 58 is positioned opposite the cutting station 50. Cores ejected via the chute will be ejected into a suitable container or transporting device for transport to a packaging location.

Referring now to FIGS. 7 and 10, the core ejection mechanism will be described. A core received in one of the retaining slots 47 is held between resilient fingers 102. Mounted in each slot 47 below the retained cores is a core ejection bar 104. The ejection bar 104 is movable outwardly in its slot to urge a retained core out of the slot via an ejection activator 106 (see FIG. 2) which urges ram member 108 outwardly to engage a pin member 110 projecting outwardly from the bar 104 through guide slot 112 in the outer face of the wheel 60. The ram member 108 forces the pin member 110 along the guide slot, and thus urges the ejection bar outwardly to force the core out of the retaining slot. The ejection bar is urged back into its innermost position the next time a core is urged into the retaining slot.

Figure 13:
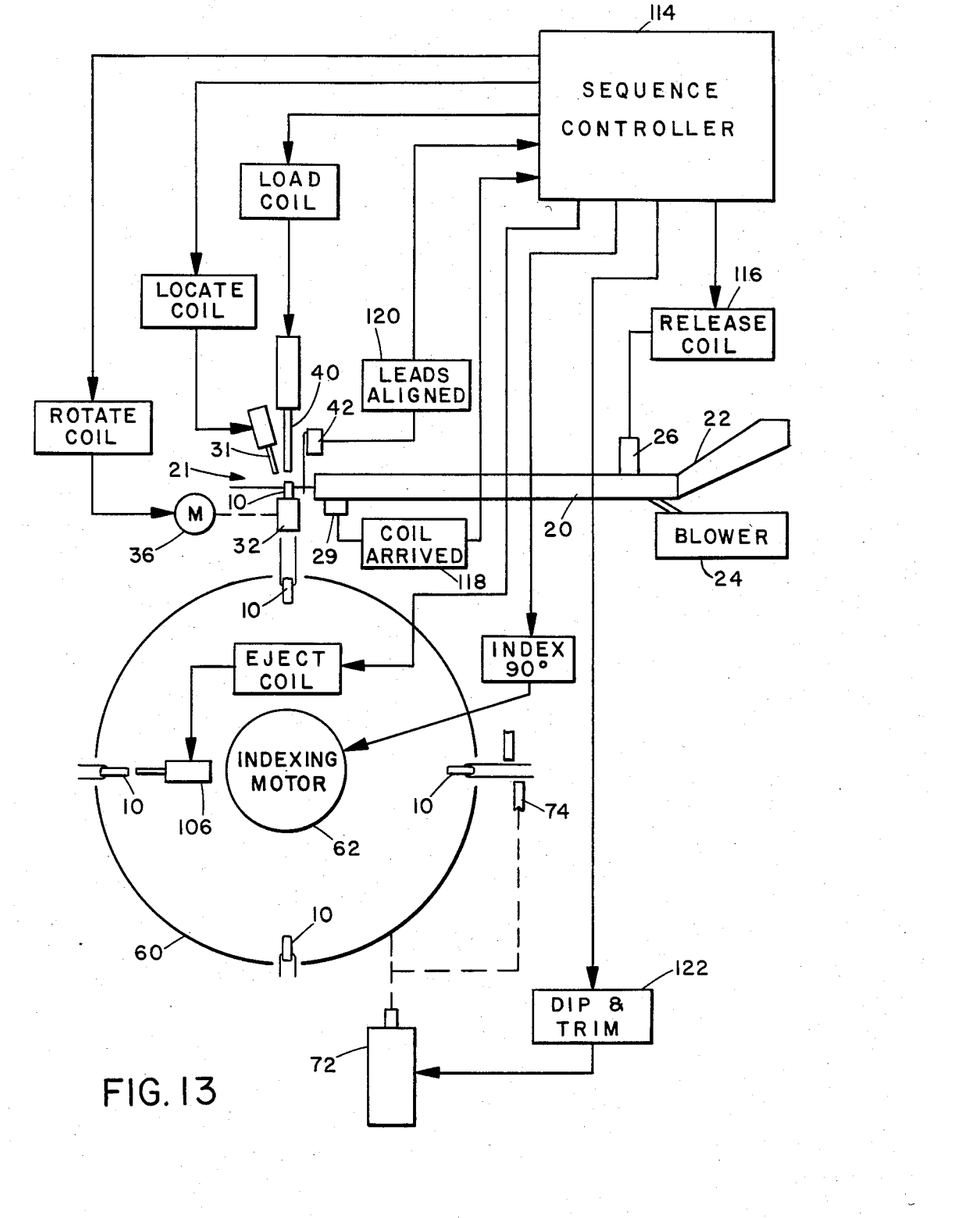
FIG. 13 is a schematic of the operating system of the machine.

The apparatus described above is designed to continuously step a series of wound toroidal cores one after the other through the successive processing stations under the control of an operating system illustrated schematically in FIG. 13. Thus, a plurality of cores in various states of finishing are being handled at any one time, and core ends can be finished at a relatively fast rate. The production rate is thus much faster with this apparatus than when the core ends are finished by hand.

The overall operation of the apparatus, including the various processing operations, core feeding and transportation, is controlled in sequence by a sequence controller 114, (see FIG. 13) which may, for example, comprise a suitable programmed microprocessor.

The progress of a series of cores one after the other through the various stations, i.e. receiving station, forming die station, cutting station, tinning station, and ejection station, will now be described.

A core is ejected from the core winder into the feed tube 20 and will be stopped against retaining latch 26. A release coil 116 is actuated via the sequence controller to raise the latch 26 and allow the core to be blown along the tube into the apparatus. The retaining latch is then dropped back into place to retain the next core ejected from the winder. When the first core arrives at the receiving station 21, a core arrival signal 118 is sent from the arrival sensor 29 to the sequence controller. The controller 114 then controls the core stop 31 to locate the core and the roller drive motor 36 to rotate the rollers 32, thus rotating the received core about its axis until the axially projecting wire ends are detected by microswitch 42. This indicates that the wire ends have reached their highest possible position, or position where they are spaced as far as possible from the forming die 44.

It can be seen from FIG. 8 that each core received at the receiving or loading station is orientated with its plane or transverse axis in alignment with the bore 46 in forming die 44. When the wire ends have reached the microswitch 42, which may be positioned to contact either the trailing or the leading wire end, a core orientated signal 120 is sent to the controller 114. This activates the core loading activator 40 to force the core downwardly through the die 44 and into the aligned core retaining slot 47 in indexing wheel 60, as indicated in dotted outline in FIG. 7.

As the core is forced through the die 44, the wire ends will be swept backwards away from the core so that they project parallel to one another and generally outwardly from the core, as indicated in FIGS. 10 and 13. Although the microswitch 42 is preferably positioned to detect the arrival of the wire ends at their uppermost position so that they project generally radially outwards when forced through the die, other wire end orientations may be used so that the bent back wire ends project in any direction between the radial and tangential extremes. The arriving core need not be fed downwardly through the die, but may instead be fed in horizontal or other non-vertical direction through a suitably orientated die.

The loading activator will force the core into an aligned, uppermost retaining slot 47 in the indexing wheel. Once the loading activator has been retracted, the retaining latch can be raised again to allow the next core to be fed into the receiving station. At the same time that the first core is being fed into the uppermost retaining slot, any core present in the slot aligned with the ejection chute (see FIG. 10) may be ejected. The sequence controller 114 will operate the ejection activator to force the aligned core into the ejection chute.

Once the first core has been loaded and any finished core aligned with the ejection chute has been ejected, the controller initiates a "dip and trim" operation signal 122. This controls the vertical activator 72 to retract the ram 73 into cylinder 124 and thus lower the entire transport mechanism on carriage 68 running on the rails 70 down into the dotted line position indicated in FIGS. 1 and 4. At this point, the wire ends of the core carried in the lowermost retaining slot 47 will be dipped in the solder bath 54 as shown in FIG. 7, which burns off the insulation and tins the leads. At the same time, the cutter blade 74 will be forced inwardly in the guide channel 75 by the action of the cam roller running in the inclined slot 90 (see FIG. 4). The blade will cut off the wire ends of the adjacent core by shearing them against the edge of the lead receiving slot 78 as it is urged into the channel (see FIG. 6). Thus, at the same time as the lowermost core is having its ends tinned, the next preceding core at the cutting station will have its wire ends trimmed.

After a predetermined interval sufficient to tin the wire ends, the sequence controller again operates the vertical activator to raise the carriage and transport mechanism back into their original positions. The indexing motor is then operated to rotate the wheel 60 clockwise by 90 degrees. At this point the core which has just been tinned by dipping in the solder bath will be aligned with the ejection chute, the preceding core which has had its wire ends trimmed will be in the lowermost position above the solder bath, and the previously loaded new core will be at the cutting station.

The sequence is then repeated, with a new core which has previously been loaded and aligned at the receiving station being forced through the forming die into the empty uppermost slot and the finished core being ejected into the ejection chute. Thus each core is stepped through the apparatus in the following sequence:

PROCESSING SEQUENCE

1. Core fed into receiving station.
2. Core orientated.
3. Core forced through forming die into receiving slot.
4. Core rotated to cutting station.
5. Core wire ends sheared by lowering of transport mechanism, forcing cutting blade inwardly.
6. Core rotated into tinning station.
7. Cut wire ends of core dipped in solder bath.
8. Core raised and rotated to ejection station.
9. Core ejected.

Since up to five cores in various stages of wire and finishing are in the apparatus at any one time, the overall processing rate can be very high.

The sequence controller 114 can be suitably programmed to control the sequence of operations. One possible repeated sequence is:

1. Core fed into uppermost slot while finished core at ejection station ejected;
2. Cores dipped and trimmed while next arriving core from winder is received and orientated;
3. Wheel indexed 90 degrees;
4. Return to step (1).

With this apparatus and sequential processing method significantly faster production rates can be achieved, labor is reduced and a more consistent higher quality product can be produced. Production rates of up to 240 cores finished per hour have been achieved with this apparatus.

Although a preferred embodiment of the invention has been described above by way of example, it will be understood by those skilled in the field that modifications may be made to the disclosed embodiments which are with the scope of the invention as defined by the appended claims.

We claim:

1. Apparatus for processing the leading and trailing wire ends projecting axially from both sides of a wound toroidal core; comprising:
    a forming die for bending projecting wire ends of a wound toroidal core;
    a receiving means aligned with the forming die for receiving and locating a wound core at a position spaced from and aligned with said forming die;
    orienting means for orienting a received wound core relative to said forming die such that the projecting wire ends are in a predetermined position remote from said die; said orienting means comprising means for rotating said wound core and sensor means for detecting when said wire ends reach said predetermined position remote from said forming die; and
    loading means for urging said oriented wound core through said forming die, said forming die comprising means for sweeping said wire ends back to project parallel to one another and away from said wound core.

2. Apparatus as claimed in claim 1, wherein said sensor means comprises means for sensing when said wire ends are positioned as far as possible from said forming die.

3. Apparatus as claimed in claim 1 including:
    a cutting station having means for cutting the wire ends of a wound core to a predetermined length; and
    transport means for transporting a wound core urged through the forming die to the cutting station.

4. Apparatus as claimed in claim 3, further including:
    a tinning station comprising a solder bath;
    said transport means including means for transporting a wound core from said cutting station to said tinning station and means for lowering a wound core to dip its wire ends into said solder bath for predetermined interval.

5. Apparatus as claimed in claim 4, including:
    an ejection station including means for ejection of finished wound cores,
    said transport means further including means for transporting finished wound cores from said tinning station to said ejection station.

6. Apparatus as claimed in claim 5, wherein said transport means includes an indexing wheel having a series of spaced retaining slots for retaining wound cores, each slot including ejection means for ejecting a retained wound core, said forming die, cutting station, tinning station and ejection station being spaced around said wheel at spacings equal to the spacings between the retaining slots; and said transport means further including means for rotating said wheel to move each slot from one station to the next, and means for lowering and raising the wheel to dip a wound core at the tinning station in the solder bath.

7. Apparatus as claimed in claim 6, further including sequence controller means for controlling and coordinating operation of said receiving means, orientating means, loading means, transport means and ejection means.

8. Apparatus as claimed in claim 6, wherein said means for cutting the wire ends of a wound core at the cutting station comprises a cutting blade and means for moving the blade across the wire ends as the wheel is lowered to dip a wound core in the solder bath.

9. Apparatus as claimed in claim 1, further including feed means for feeding a series of wound cores one by one from a winder machine into said receiving means, said feed means comprising a connecting tube for connecting an exit of said winder machine to said receiving means, means for urging wound cores along said tube, and latch means for stopping a wound core in said tube until said receiving means is empty.

10. Apparatus as claimed in claim 9, including sequence controller means for controlling and coordinating operation of said latch means, receiving means, orientating means and loading means, said receiving means including first sensor means for sensing the arrival of a wound core and transmitting a first signal to said controller means, said sensor means for sensing when the wire ends of a wound core are in said predetermined position including means for transmitting a second signal to said controller, said controller including means for activating said rotating means in response to said first signal, activating said loading means in response to said second signal, and releasing said latch means after each activation of said loading means.

11. A method of automatically sequentially processing the leading and trailing wire ends projecting axially from both sides of a series of wound toroidal cores, comprising the steps of:
  feeding one of the series of wound cores into a receiving station;
  rotating the wound core until the wire ends reach a predetermined position;
  urging the rotated core through a forming die aligned with the receiving station to bend back the projecting wire ends to project substantially parallel to one another;
  feeding the next one of the series of wound cores into the receiving station such that a new wound core is received after each wound core has been urged through the forming die,
  thereafter feeding the wound cores one after the other through the following processing steps:
  cutting the bent back wire ends to a predetermined length;
  dipping the cut wire ends in a solder bath for a predetermined time interval; and
  ejecting the finished core.

12. A method of automatically processing the projecting wire ends of a series of wound cores by stepping the wound cores one after the other through a series of processing stations comprising the steps of:
  feeding a first wound core into a receiving station;
  forcing the first wound core through a forming die to bend its wire ends back to project substantially parallel to one another;
  feeding a second wound core into the receiving station;
  transporting the first wound core to a cutting station for cutting its bent wire ends to a predetermined length;
  forcing the second wound core through the forming die;
  feeding a third wound core into the receiving station;
  simultaneously transporting the first wound core to a tinning station and the second wound core to the cutting station;
  simultaneously dipping the cut wire ends of the first wound core in a solder bath and cutting the wire ends of the second wound core;
  forcing the third wound core through the forming die;
  feeding a fourth wound core into the receiving station;
  sumultaneously transporting the first wound core to an ejection station, the second wound core to the tinning station, and the third wound core to the cutting station;
  simultaneously dipping the wire ends of the second wound core and cutting the wire ends of the third wound core;
  ejecting the first wound core and forcing the fourth wound core through the forming die;
  feeding a fifth wound core into the receiving station; and
  repeating the processing steps so that a sequence of wound cores are processed one after another through the various stations.

* * * * *